(12) United States Patent
Naghian

(10) Patent No.: US 7,024,203 B1
(45) Date of Patent: Apr. 4, 2006

(54) ADMISSION CONTROL METHOD

(75) Inventor: Siamäk Naghian, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/913,457

(22) PCT Filed: Feb. 16, 2000

(86) PCT No.: PCT/FI00/00118

§ 371 (c)(1),
(2), (4) Date: Oct. 3, 2001

(87) PCT Pub. No.: WO00/49824

PCT Pub. Date: Aug. 24, 2000

(30) Foreign Application Priority Data

Feb. 16, 1999 (FI) ..................... 990312

(51) Int. Cl.
*H04Q 7/20* (2006.01)

(52) U.S. Cl. .................. 455/453; 455/436; 455/437; 455/442; 455/439; 455/450; 455/452.2; 455/522

(58) Field of Classification Search ............. 455/453, 455/442, 436, 450, 456.2, 437, 452.2, 438, 455/439, 522, 552.1; 370/230, 232, 252
See application file for complete search history.

(56) References Cited

U.S. PATENT DOCUMENTS

| | | | | | |
|---|---|---|---|---|---|
| 4,670,899 | A | * | 6/1987 | Brody et al. ................ | 455/453 |
| 5,276,907 | A | * | 1/1994 | Meidan ...................... | 455/436 |
| 5,475,861 | A | * | 12/1995 | Hall ........................... | 455/453 |
| 5,488,609 | A | * | 1/1996 | Hluchyj et al. ............. | 370/232 |
| 5,513,257 | A | * | 4/1996 | Yoo et al. .............. | 379/221.03 |
| 5,521,905 | A | * | 5/1996 | Oda et al. ................... | 370/232 |
| 5,687,171 | A | * | 11/1997 | Shin et al. ................. | 370/335 |
| 5,838,671 | A | | 11/1998 | Ishikawa et al. | |
| 5,859,839 | A | * | 1/1999 | Ahlenius et al. ........... | 370/252 |
| 5,872,771 | A | * | 2/1999 | Park et al. .................. | 370/252 |
| 5,886,988 | A | * | 3/1999 | Yun et al. ................... | 370/329 |
| 6,081,715 | A | * | 6/2000 | La Porta et al. ........... | 455/445 |
| 6,088,335 | A | * | 7/2000 | I et al. ....................... | 370/252 |
| 6,128,506 | A | * | 10/2000 | Knutsson et al. .......... | 455/522 |
| 6,212,384 | B1 | * | 4/2001 | Almgren et al. ........... | 455/446 |
| 6,216,006 | B1 | * | 4/2001 | Scholefield et al. ....... | 455/450 |

(Continued)

FOREIGN PATENT DOCUMENTS

EP      0 750 440 A2    12/1996

(Continued)

OTHER PUBLICATIONS

Office Action dated Jun. 27, 2005 in corresponding Japanese Application No. 2000-600442.

*Primary Examiner*—Sonny Trinh
*Assistant Examiner*—Huy Phan
(74) *Attorney, Agent, or Firm*—Cohen, Pontani, Lieberman & Pavane

(57) ABSTRACT

According to the invention, better requests resulting in the load being under a first predetermined limit are admitted. If a bearer request would result in the load being over the first predetermined limit, the admission control entity tries to make room for the bearer request, i.e. release resources without degrading the quality of service (QoS) provided for the existing bearers. The admission control entity may perform this by adjusting power control parameters, handover control parameters, or both. If the admission control entity is able to make enough room for the new bearer or bearers, the request is admitted.

83 Claims, 8 Drawing Sheets

U.S. PATENT DOCUMENTS

| | | | |
|---|---|---|---|
| 6,253,087 B1 * | 6/2001 | Corbett .................... | 455/450 |
| 6,266,529 B1 * | 7/2001 | Chheda .................... | 455/436 |
| 6,278,882 B1 * | 8/2001 | Choi ........................ | 455/453 |
| 6,317,600 B1 * | 11/2001 | Salonaho et al. ........ | 455/453 |
| 6,381,458 B1 * | 4/2002 | Frodigh et al. .......... | 455/442 |
| 6,400,954 B1 * | 6/2002 | Khan et al. .............. | 455/450 |
| 6,512,925 B1 * | 1/2003 | Chen et al. .............. | 455/442 |
| 6,529,489 B1 * | 3/2003 | Kikuchi et al. .......... | 370/331 |
| 6,597,920 B1 * | 7/2003 | Yegani et al. ............ | 455/512 |
| 6,603,745 B1 * | 8/2003 | Antonio et al. .......... | 370/318 |
| 6,741,560 B1 * | 5/2004 | Wallmeier ................ | 370/230 |
| 6,771,648 B1 * | 8/2004 | Kim et al. ................ | 370/395.2 |

FOREIGN PATENT DOCUMENTS

| | | |
|---|---|---|
| EP | 0 889 663 A1 | 1/1999 |
| JP | 09-084105 | 3/1997 |
| WO | WO 99/23842 | 5/1999 |

* cited by examiner

ADMISSION CONTROL METHOD

CROSS REFERENCES TO RELATED APPLICATIONS

This is a U.S. national stage application under 35 U.S.C. §371 of international stage application No. PCT/FI00/00118, filed on Feb. 16, 2000. Priority is claimed under 35 U.S.C. §119(a) and 35 U.S.C. §365(b) from Finnish Patent Application No. 990312, which was filed on Feb. 16, 1999; and from which priority was properly claimed in the aforementioned international stage application.

TECHNICAL FIELD OF THE INVENTION

This invention is related to radio resource usage in cellular telecommunication systems, more accurately to admission control methods used in establishing of new connections. The invention is directed to a method according to the preamble of claim 1.

BACKGROUND OF THE INVENTION

In cellular telecommunication systems a single speech connection or data connection through the cellular telecommunication network is called a bearer. Generally, a bearer is associated with a set of parameters pertaining to data communication between a certain terminal equipment and a network element, such as a base station or an interworking unit (IWU) connecting the cellular network to another telecommunications network. The set of parameters associated with a bearer comprises typically for example data transmission speed, allowed delays, allowed bit error rate (BER), and the minimum and maximum values for these parameters. A bearer may further be a packet transmission bearer or a circuit switched bearer and support for example transparent or non-transparent connections. A bearer can be thought of as a data transmission path having the specified parameters connecting a certain mobile terminal and a certain network element for transmission of payload information. One bearer always connects only one mobile terminal to one network element. However, a bearer can pass through a number of network elements. One mobile communication means (ME, Mobile Equipment) may in some cellular telecommunication systems support one bearer only, in some other systems also more than one simultaneous bearers.

In order to be able to transmit information in a desired way, connections over the radio interface have to obtain a desired level of quality. The quality can be expressed for example as the C/I i.e. Carrier to Interference ratio, which indicates the ratio of received carrier wave power to received interfering power. Other measures for the quality of a connection are SIR i.e. Signal-to Interference ratio, S/N i.e. Signal to Noise ratio, and S(I+N) i.e. Signal to Noise plus Interference ratio. The bit error rate (BER) or frame error rate (FER) are also used as measures of connection quality. Typically, a certain target level for one of these or other corresponding measures is determined before hand, and for each connection, the transmission power is adjusted to be such that the target level is reached as closely as possible. The transmission power should not be higher than what is necessary for obtaining the desired target level, since a too high transmission level wastes electrical energy in the transmitting equipment, which is crucial with handheld mobile stations, and causes interference to other connections.

Admission control is a crucial function in ensuring, that each bearer obtains the desired SIR level. The purpose of admission control is to examine each new request for a new bearer, and determine whether the requested service can be provided without degrading the service to other bearers taking into account the transmission power of the requested bearer, the transmission bite rate of the bearer, the processing gain, and the bearer quality requirements. If the new bearer can be serviced without harming other bearers, the request is admitted. Otherwise it is scheduled i.e. put on a queue, renegotiated or modified, or rejected. Admission control typically co-operates with power control, whereby the transmission power of some of the other bearers may be adjusted in order to guarantee the SIR target level of the other bearers.

Various admission control algorithms have been proposed in the past. The article "SIR-Based Call Admission Control for DS-CDMA Cellular Systems" by Zhao Liu and Magda El Zarki, I2 Journal on selected areas in communications, vol. 12, no. 4, pp. 638–644, May 1994, describes an algorithm based on the concept of residual capacity. Residual capacity is defined as the additional number of initial calls a base station can accept. If the residual capacity is larger than zero, new calls are admitted. The residual capacity is determined from measured SIR levels and a threshold SIR level.

Another algorithms are described in the article "call Admission in Power Controlled CDMA Systems" by Ching Yao Huang and Roy D. Yates, in proceedings of I2 VTS 46th Vehicular Technology Conference, Apr. 28–May 1, 1996, Atlanta, USA, pp. 1665–1669. In this article, two simple algorithms are presented. In the first algorithm, a new call is blocked when that new call would cause ongoing calls to transmit at maximum power. In the second algorithm, a new call is blocked if the total received powers measured at the base station exceeds a predetermined threshold.

These algorithms function well, when the calls i.e. bearers are relatively similar in terms of resource usage, and any admission tresholds are set to a level where the admission of a bearer does not increase the load too near to the maximum capacity.

However, these algorithms do not function well, when the bearers have widely varying properties, i.e. when the network needs to handle both low bit rate bearers such as normal speech bearers, and high bit rate bearers such as high-capacity data bearers or live video bearers. Such a variety of services will be provided for example by the UMTS cellular telecommunication system presently under development. For example, in the conventional algorithm in which a new call is allowed if the total received power measured at the base station is under a predetermined treshold, a high bit rate bearer may increase the network load too near to the maximum capacity. This can be prevented by lowering the threshold so that any high rate bearers allowed close to the threshold still do not increase the total load too much, but in that case, the low bit rate speech bearers end up being refused even if the remaining capacity could accommodate them.

In this specification, the term could region is used to mean a region of the cellular telecommunication system, which is controlled by a single admission control entity or process, i.e., the region whose transmissions are taken into account when deciding about the admission of a new bearer. A control region may comprise for example a sector of a cell, a cell, or a plurality of cells such as a routing area or a whole ratio access network.

In the following, various other functions of a cellular network controlling the bearers are described, namely load control, power control, and handover control.

The main task of load control (LC) is to ensure, that the cellular system is operating at a point, where high capacity is achieved without excessive usage of power in the mobile stations, while obtaining a good connection quality. The definition of the load limit, up to which the system can be allowed to be loaded, is a critical task for radio resource management. Since an overload situation may considerably undermine the performance of the network, it is essential to control the load in order to avoid an overload situation. Some examples of the main functions of load control are network balancing, adjustment of power control parameters and handover parameters, and congestion control.

The aim of power control (PC) is to adjust the power levels of the mobile stations and the base stations in order to obtain the desired signal level at the receivers at either end, i.e. take care of the near-far problem. The power control also takes care of changing the power levels as a response to large changes in shadowing and for example as a response for fast changes in SIR level.

Handover control (HC) takes care of managing the change of connections of a mobile station, when the mobile station moves from one cell to another.

Typically, these functions are implemented in a network element as software programs executed by the processing unit of the network element. The means performing these functions are in this specification called entities, i.e. a HC entity takes care of handover control, a PC entity takes care of power control, a LC entity takes care of load control, and an AC entity takes care of admission control.

SUMMARY OF THE INVENTION

An object of the invention is to realize an admission control method, which is able to maintain the system load below a predetermined limit. A further object of the invention is to realize an admission control method, which is also able to maximize the admission probability for a bear request.

The objects are reached by arranging the admission control to produce a load estimate based at least on the bearer request, and if the load estimate is above the limit, to attempt to make room for the requested bearer or bearers.

According to the invention, bearer requests resulting in the load being under a first predetermined limit are admitted. If a bearer request would result in the load being over the first predetermined limit, the admission control entity tires to make room for the bearer request, i.e. release resources without degrading the quality of service (QoS) provided for the existing bearers. The admission control entity may perform this by adjusting power control parameters, handover control parameters, or both. If the admission control entity is able to make enough room for the new bearer or bearers, the request is admitted.

Other objects and features of the present invention will become apparent from the following detailed description considered in conjunction with the accompanying drawings; whereas the various features of novelty which characterize the invention are pointed out with particularity in the claims annexed to and forming a pair of the disclosure. For a better understanding of the invention, its operating advantages, and specific objects attained by its use, reference should be had to the drawing and descriptive matter in which there are illustrated and described preferred embodiments of the invention. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described in more detail in the following with reference to the accompanying drawings, of which

Same reference numerals are used for similar entities in the figures.

DETAILED DESCRIPTION

According to the invention, a control region of a cellular network has a first predefined limit for the transmission load, which first predefined limit is the upper limit of a so called stable load region. The stable load region is a load region, within which the system can handle all traffic. The load region above the stable load region is called the critical load region. The critical load region is used as a soft capacity margin of the control region, for handling sudden changes in the amount of interference. When the load is in the critical load region, preferably only high priority calls and emergency calls should be accepted by the network. Admission control can exploit the soft capacity range to manage the dynamic behaviour of the system by fine-tuning the "cell breathing" effect within the network. Above the critical load region is the overload region. The upper limit of the critical load region is a second predefined limit. One of the aims of the inventive admission control method is to maintain the system load within the stable load region, while attempting to maximize the admission probability of new calls with the desired QoS.

A. An Example of an Admission Control Method

Figure 1:
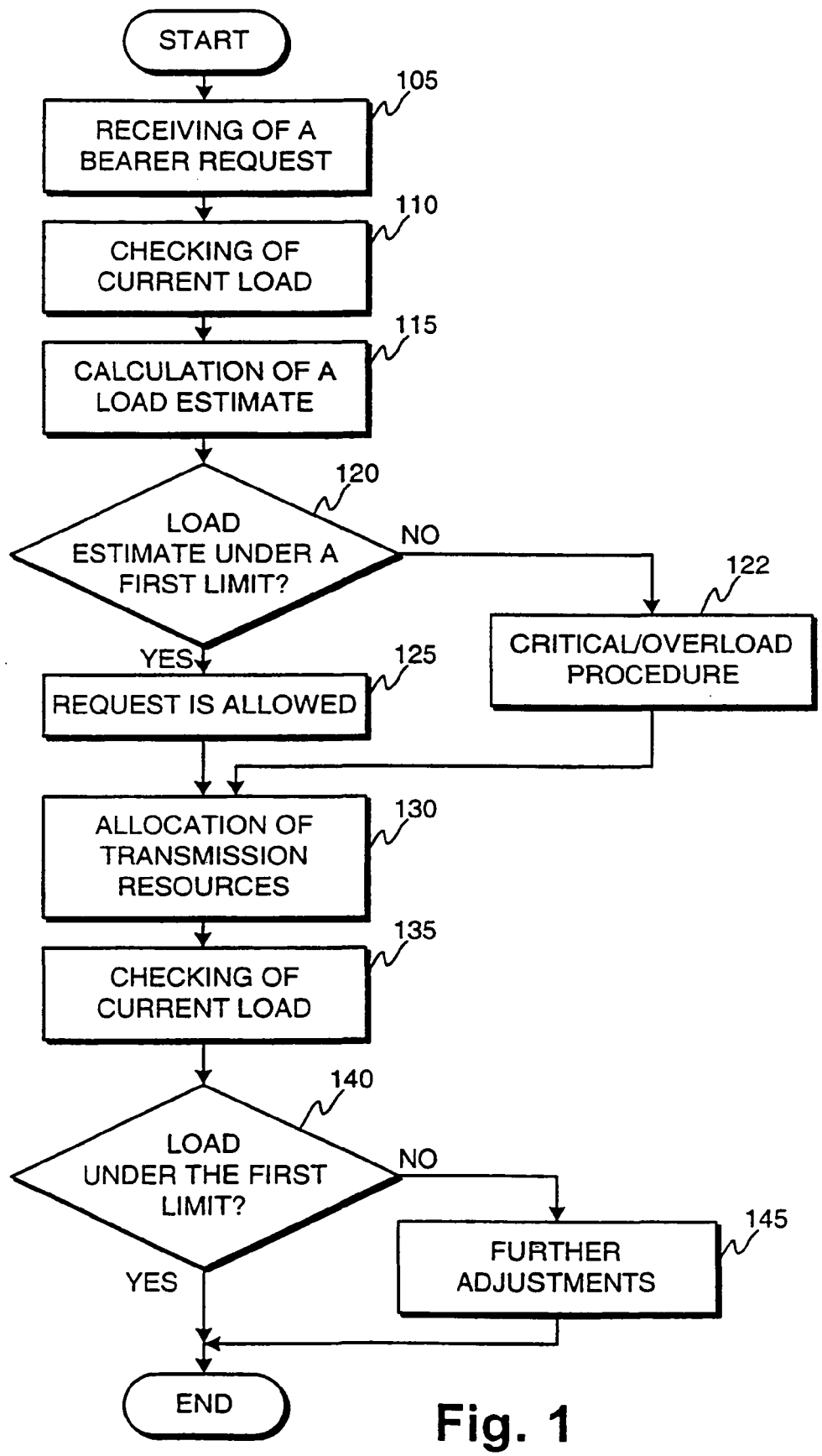
FIG. 1 illustrates an admission control method according to an advantageous embodiment of the invention.

In the following, an admission control method according to an advantageous embodiment of the invention is described with reference to FIGS. 1 and 2.

In the first step 105, a bearer request is received by the admission control entity. The bearer request may be originated by a mobile station for example if the user wishes to make a call, or by the cellular network for example if a mobile station is being called. As a response to receiving the bearer request, the admission control entity checks the current load in step 110. In this step the admission control entity may check the load for example by requesting current load information from a load control entity. Next, the admission control entity calculates 115 a result load estimate based at least on the current load and the bearer request. Preferably, the resulting load estimate comprises the transmission i.e. interference powers of both existing bearers and the new bearer(s).

In the following step 120, the result load estimate is compared to a first predetermined limit, i.e. the upper limit of the stable load region. If the load estimate is higher than the first predetermined limit, a further procedure for handling critical load and overload situations is started 122. The procedure is described later in this specification. If the load estimate is found to be lower than the first predetermined limit in step 120, the bearer request is allowed 125, and transmission resources are allocated 130 for the bearer or bearers. The transmission resources can be for example radio resources, logical resources, codes, transmission capacity, or other resources. If the procedure for handling critical load and overload situations results in a positive decision for the bearer request, the method is continued at step 130 after the procedure.

The actual resulting load is checked in step 135 and compared to the first predetermined limit in step 140. If the load is under the first predetermined limit, the method is ended. If the load is not under the first predetermined limit, the parameters of at least one bearer are further adjusted at step 145 to bring the total load under the first predetermined limit, after which the method is ended.

The adjustment step 145 may for example comprises renegotiation of the quality of service level provided to the at least one bearer. The renegotiated or modified bearer or bearers may be the requested bearer or bearers, or previously existing bearers.

Figure 2:
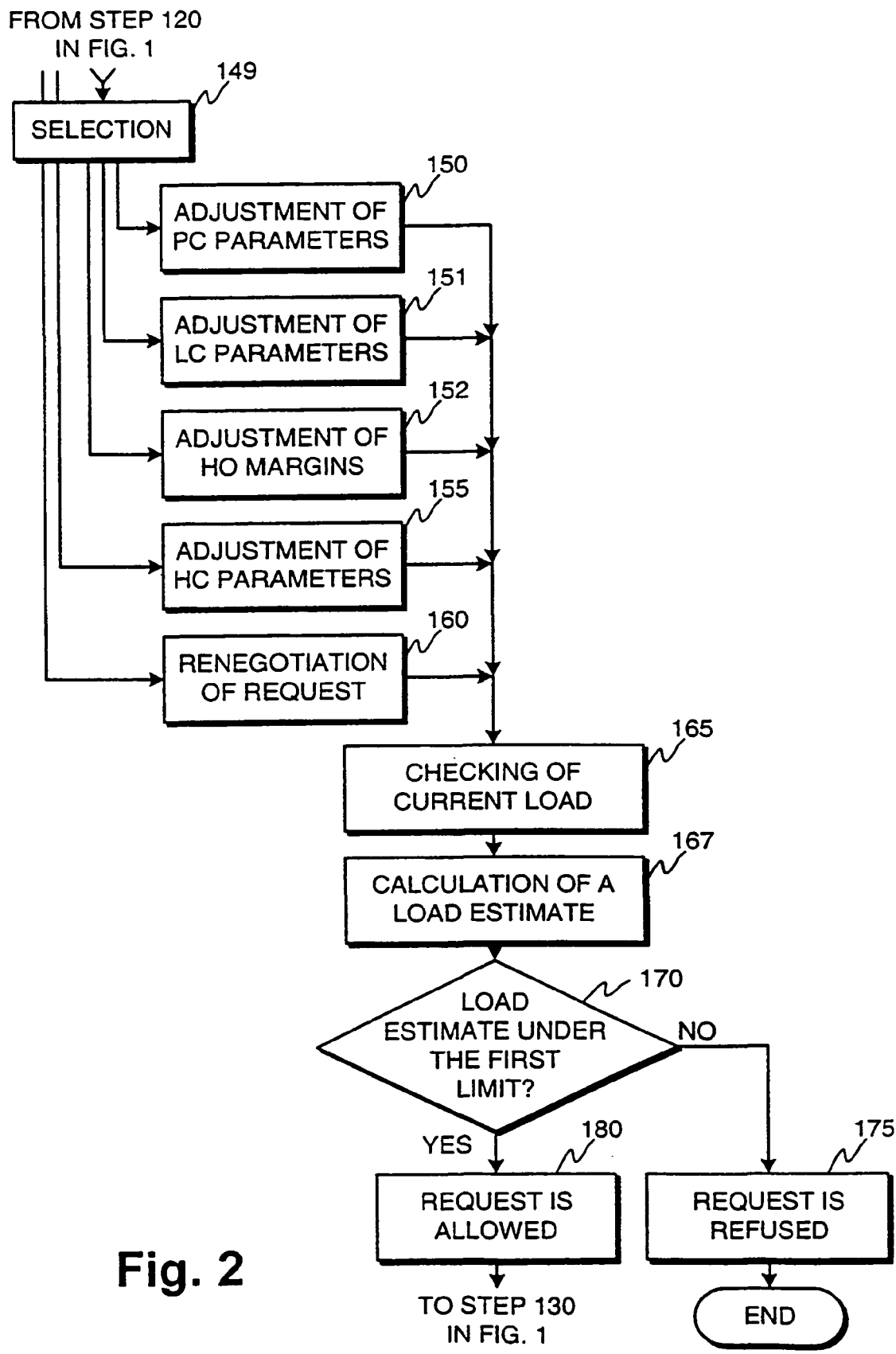
FIG. 2 illustrates an example of part of an admission control method taking care of critical load or overload situations according to an advantageous embodiment of the invention.

FIG. 2 illustrates one example of a procedure for handling situations, in which the admission of the bearer request would result in the load level being in the critical or overload region. According to this example, one of steps 150, 151, 152, 155, and 160 is taken to relieve the load, as selected in step 149. In step 150, power control parameters such as upper and lower limits of the transmission power margins of the existing connections of a control region of the cellular system are readjusted, which may result in the lowering of transmission power for one or more existing bearers, thereby allowing the admission of new bearers. In step 151, load control parameters of the cellular network are adjusted. In step 152, soft handover and soft capacity margins of the cellular network are adjusted. In step 155, handover control parameters of a control region of the cellular system are adjusted. Such parameters typically comprise for example parameters, which define thresholds for triggering a handover (or a soft handover) from one cell to another. Adjusting the handover control (HC) parameters may result in the handover of one or more existing bearers to another control region. In the soft handover case, the adjustment may also result in addition or releasing of a branch of an existing bearer as well as in optimization of the soft capacity margin. In any case, the handover control parameter adjustment may release transmission resources in the current control region. In step 160, the parameters of one or more requested bearers are renegotiated or modified to find, if possible, suitable bearer properties having lower requirements for transmission resources.

After the performing one of the steps 150, 151, 152, 155, and 160, the current load is checked 165, and a new load estimate is calculated 167. If the load estimate is now below the first predetermined limit, the request is allowed 180, and the method is continued at step 130 of FIG. 1. In case the adjustments or renegotiations of steps 150, 155, and 160 were not large enough and the load estimate is still above the first predetermined limit, the bearer request is refused 175 and the admission control method is ended.

Figure 3:
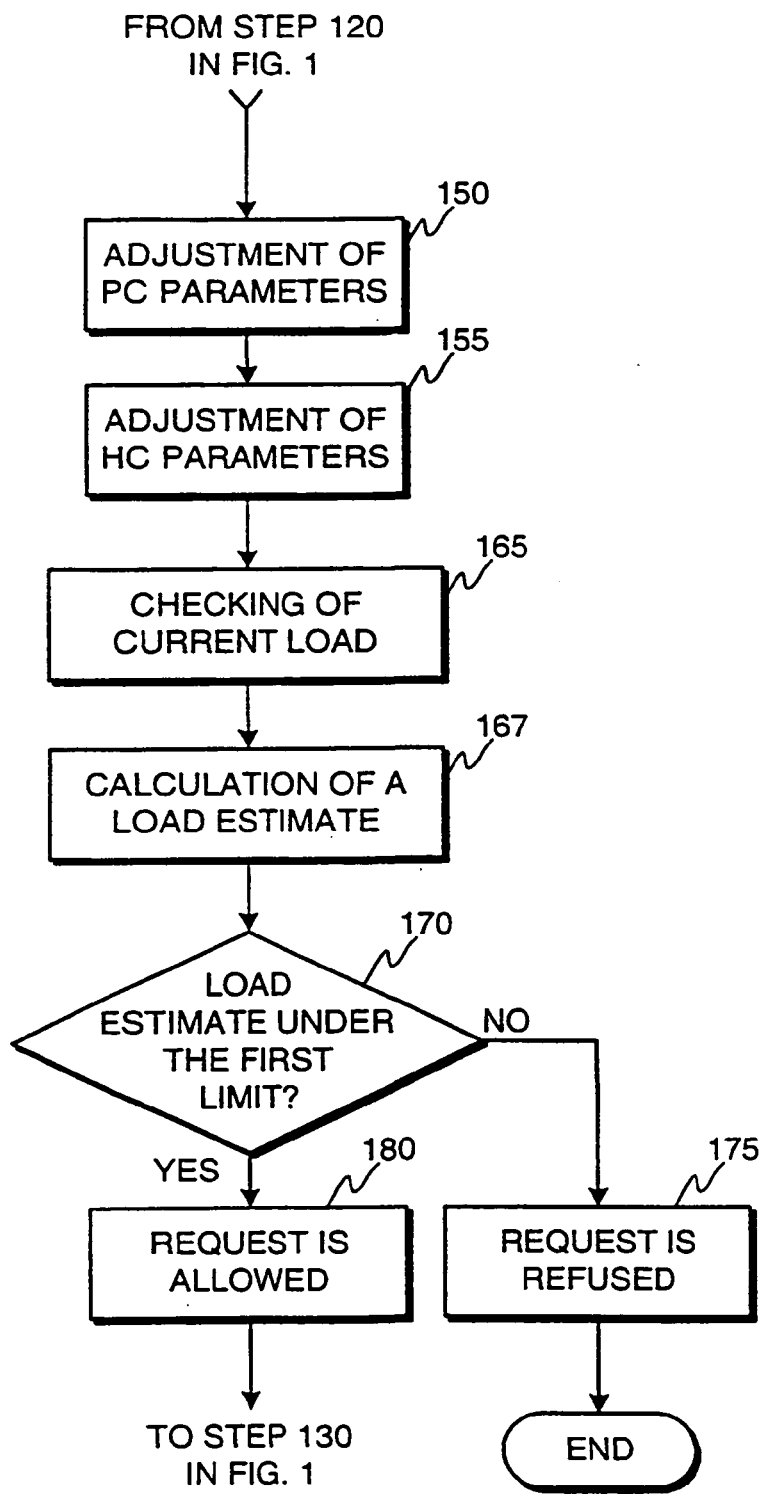
FIG. 3 illustrates a further example of a part of an admission control method taking care of critical load or overload situations according to an advantageous embodiment of the invention.

FIG. 3 illustrates a further example of a procedure for handling situations, in which the admission of the bearer request would result in the load level being in the critical or overload region. According to this example, both power control parameters and handover control parameters of the control region of the cellular network are adjusted in steps 150 and 155 to relieve the load.

After performing the steps 150 and 155 the current load is checked 165, and a new load estimate is calculated 167. If the load estimate is now below the first predetermined limit, the request is allowed 180, and the method is continued at step 130 of FIG. 1. In case the adjustments of steps 150 and 155 were not large enough and the load estimate is still above the first predetermined limit, the bearer request is refused 175 and the admission control method is ended.

Figure 4:
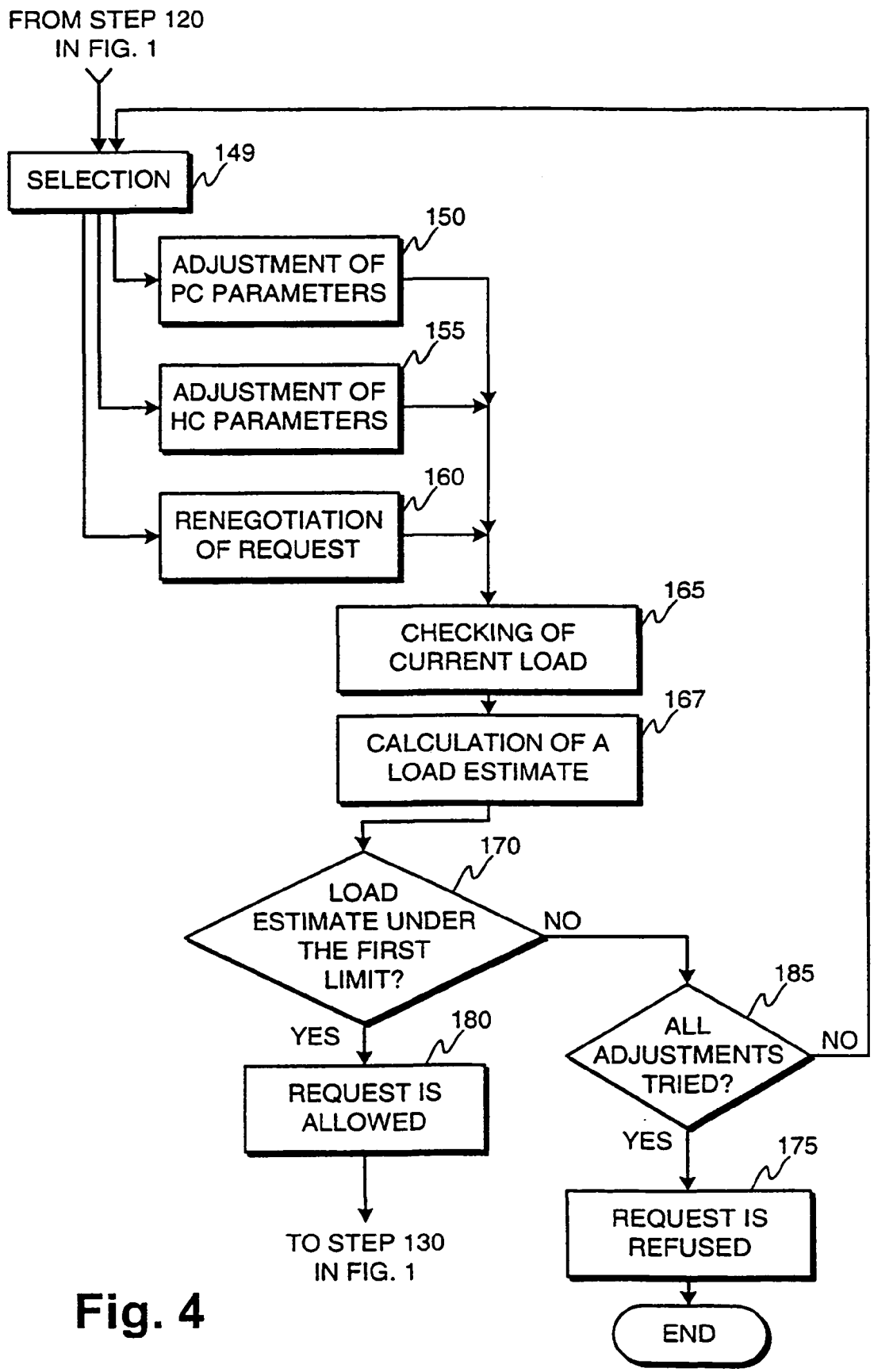
FIG. 4 illustrates yet another example of a part of an admission control method taking care of critical load or overload situations according to an advantageous embodiment of the invention.

FIG. 4 illustrates yet another example of a procedure for handling situations, in which the admission of the bearer request would result in the load level being in the critical or overload region. In this example, the available ways 150, 155, 160 of reducing the load estimate are effected, until the load estimate is under the first predetermined limit, or until all the three ways of this example are used.

According to this example, one of steps 150, 155, and 160 is taken to relieve the load, as selected in step 149. In step 150, power control parameters of a control region of the cellular system are adjusted, which may result in the lowering of transmission power for one or more existing bearers, thereby allowing the admission of new bearers. In step 155, handover control parameters of a control region of the cellular system are adjusted. Such parameters typically comprise for example parameters, which define thresholds for triggering a handover from one cell to another. Adjusting the handover control (HC) parameters may result in the handover of one or more existing bearers to another control region. In the soft handover case, the adjustment may also result in addition or releasing of a branch of an existing bearer as well as in optimization of the soft capacity margin. In any case, the handover control parameter adjustment may release transmission resources in the current control region. In step 160, the parameters of one or more requested bearers are renegotiated or modified to find, if possible, suitable bearer properties having lower requirements for transmission resources.

After performing one of the steps 150, 155, and 160, the current load is checked 165, and a new load estimate is calculated 167. If the load estimate is now below the first predetermined limit, the request is allowed 180, and the method is continued at step 130 of FIG. 1. In case the adjustments or renegotiations of steps 150, 155, or 160 were not large enough and the load estimate is still above the first predetermined limit, it is checked instep 185, if all of the available ways of relieving the load are used i.e. if all of the step 150, 155, and 160 are already taken. If these steps are taken, the request is refused in step 175 and the admission control method is ended. If at least one of these steps have not yet been taken, the method returns to step 149.

In the previous examples, the selection of the way to relieve the load in step 149 may be performed according to any criteria as demanded by the requirements of the particular application. For example, if the properties of the request bearers are such that a relatively large reduction in the use of transmission resources can be obtained without a too large reduction in the service level actually needed by the user, it is advantageous to renegotiate or modify the properties of at least one bearer. Further, the selection can be performed for example depending on how much the load estimate exceeds the first predetermined limit. The selection may also be performed in a random fashion. Different bearer types may also be treated in a different way. For example, preference can be given to real time bearers by adjusting first the properties of non-real time bearers.

In a further advantageous embodiment of the invention, instead of performing the step 145 of further adjustment of parameters of at least one bearer, the requested bearer may be rejected, scheduled i.e. put on a queue, or renegotiated or modified.

In a further advantageous embodiment of the invention, if the load estimate in the first estimation steps 115 and 120 if found to be much higher than the first predetermined limit, i.e. more than a predefined amount above the first predefined limit, the bearer request can be rejected directly without starting the process 122 for handling critical and overload situations.

B. Calculation of a Load Estimate

In this section, one example of a suitable calculation method for use in an admission control method according to the invention is described. According to this example, the determination of available capacity and whether the load will increase above the first predetermined limit is based on the SIR level in the control region and the SIR level required by the requested bearer or bearers.

We assume that the total capacity below the limit of stable load of the control region is $C_{tot}$. The available system capacity $C_a$ is then $$C_a = C_{tot} - C_{oc} = \left(1 + \frac{\frac{W}{R_b}}{\frac{E_b}{N_o}} + \alpha - \frac{v}{S}\right)_{tot} - \left(1 + \frac{\frac{W}{R_b}}{\frac{E_b}{N_o}} + \alpha - \frac{v}{S}\right)_{oc} \quad (1)$$

where $C_{oc}$ is the capacity occupied by existing bearer accesses,

S is the transmitted power level,

W is the WCDMA bandwidth, $R_b$ is the bit rate, $E_b$ is the bit energy, $N_o$ is the thermal noise spectral density, $v$ is the background noise, and $\alpha$ is the voice activity The capacity based system performance requirement is $$\text{Prob}(C_{oc} \geq C_{tot}) \leq \delta \quad (2a)$$

i.e. that the probability of existing bearers requiring more capacity that is available is below a predefined system reliability limit $\gamma$. The same requirement can be expressed in terms of SIR levels as $$\text{Prob}(SIR_{req} \geq SIR_{tot}) \leq \gamma \quad (2b)$$

The capacity of a WCDMA system is dependent on the level of interference. The minimum QoS of the requested bearer will be met if:

$$\frac{1}{SIR_{req}} \leq \left(\frac{W}{R_b} \frac{1}{\frac{E_b}{I_0}}\right)_{stable} + \left(\frac{W}{R_b} \frac{1}{\frac{E_b}{I_0}}\right)_{critical} = (Q)_{tota} \quad (3)$$

$$\Rightarrow \frac{1}{SIR_{req}} \leq \left(\frac{W}{R_b} \frac{1}{\frac{E_b}{I_{real}}}\right)_{stable} + \left(\frac{W}{R_b} \frac{1}{\frac{E_b}{I_{real}}}\right)_{critical} = (Q)_{tot}$$

where $$\frac{E_b}{I_{real}} = \left[\left(\frac{E_{bv} + E_{bd}}{N_0}\right)^{-1} + \left(\frac{G}{M}\right)^{-1}\right] \quad (4)$$

in which

M is the number of simultaneous users,

G is the process gain, $$\frac{E_b}{N_0}$$

is the signal to noise ratio due to thermal noise and other cell interference, $E_{bv}$ is the signal energy per bit due to real time bearers, and $E_{bd}$ is the signal energy per bit due to non-read time bearers.

The requested bearer is admitted if $$SIR_{req} \leq SIR_{tot} \Rightarrow SIR_{req} \leq SIR_{stable} + SIR_{critical} - SIR_{oc} \quad (5)$$

or, in other terms, $$SIR_{req} \leq SIR_{tot} - SIR_{oc} \leq SIR_{available} \quad (6)$$

where $SIR_{req}$ is the SIR level required by the requested bearer, $SIR_{tot}$ is the total SIR level within the control region, $SIR_{stable}$ is the stable SIR margin that indicates the stable operation region of the system, i.e. the first predetermined limit, $SIR_{critical}$ is the width of the critical margin, i.e. the soft capacity margin, $SIR_{oc}$ is the SIR level occupied by existing bearers, and $SIR_{available}$ is the SIR level that can be allocated to the new bearers.

In a further advantageous embodiment of the invention, the available capacity is calculated in terms of transmission power in the control area. In this embodiment, the available capacity, i.e. amount of available transmission or in other words and interference power $P_{available}$ can be calculated as follows:

$$P_{available} = (P_{stable} + P_{critical}) - \sum_{i \in m} P_m \quad (7)$$

where $P_{stable}$ is the upper limit of the stable load region, i.e. the first predetermined limit for the transmission or interference power, $P_{critical}$ is the upper limit of the critical load region, i.e. the second predetermined limit for the transmission or interference power, and m is the number of simultaneous bearer accesses in the control region.

In this embodiment, the bearer request is accepted if $$\Sigma P_{req} + \Sigma P_{oc} \leq \Sigma P_{stable} \quad (8)$$

where $P_{req}$ is the interference or transmission power of the requested bearer estimated by transmission control, and $P_{oc}$ is the interference or transmission power level occupied by already accessed bearers.

Because the characteristics of non-real time (NRT) bearers are only partly under the control of the admission control due to the nature of NRT bearers having varying bit rates etc., the admission or rejection decision is preferably based only on real time bearers.

Preferably, the admission is based on the real time bearers so that emergency calls have the highest priority, resulting in admitting them even when the load is in the critical load region, RT calls other than emergency calls have the second highest priority, and NRT calls have the lowest priority. Preferably, when attempting release of transmission resources various parameters of the network are adjusted so that this priority order is maintained. Consequently, the priority order allows the admission control to drop or hand over any requesting or existing calls according to their priorities.

In the case of multidiversity connections, the adjustment of transmission power of a mobile station (MS) can be effected as follows according to an advantageous embodiment of the invention. The admission control entity sets the BER (bit error rate) and FER (frame error rate) requirements and the initial $E_b/N_0$ setpoints for outer loop power control. The admission control entity also sets a power margin for the transmission power of a multidiversity bearer of a MS having a specified QoS. The final power adjustment decision may be performed by the MS according to the following condition, when the outer loop power control commands demand an increase of the power level:

$$P_{trx} = P_0 + DSS \leq P_{max} \epsilon P_{margin} \quad (9)$$

where DSS is the dynamic step size power to be added to the present transmission power level. Condition (9) states that the MS will increase the transmission power only if the increased power level is equal or smaller than a predetermined upper limit $P_{max}$ for the transmission power of the connection, and if the increased transmission power is within said power margin for the transmission power.

The final power adjustment decision may be performed by the MS according to the following condition, when the outer loop power control commands demand a decrease of the power level:

$$P_{trx} = P_0 + DSS \leq P_{min} \epsilon P_{margin} \quad (10)$$

Condition (10) states that the MS will decrease the transmission power only if the decreased power level is equal to or larger than a predetermined lower limit $P_{min}$ for the transmission power of the connection, and if the decreased transmission power is within said power margin for the transmission power.

In an advantageous embodiment of the invention, in the case of a multidiversity connection the admission control entity effects the adjustment of transmission power by setting a transmission power dynamic range. Such control of transmission power is applicable for both downlink and uplink transmit power adjusting.

C. Signalling Examples

In the following, some examples of signalling according to various embodiments of the invention are described. FIGS. 5, 6, 7, and 8 illustrate signalling between a bearer management (BM) entity 210, an admission control (AC) entity 220, load control (LC) entity 230, power control (PC) entity 240, and a handover control (HC) entity 250.

Figure 5:
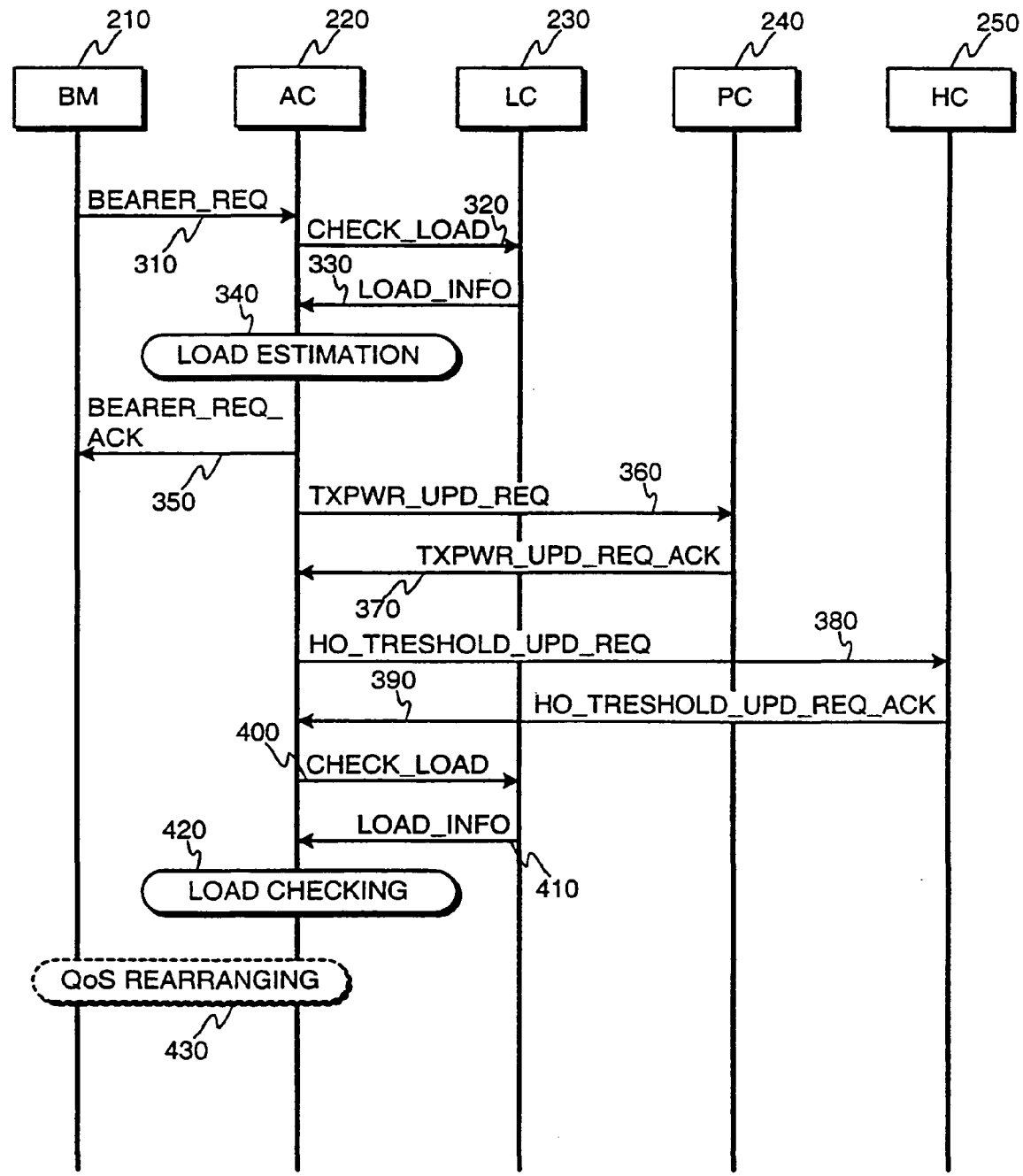
FIG. 5 illustrates signalling of an example of an admission control method according to an advantageous embodiment of the invention.

FIG. 5 illustrates signalling of an example of an admission control method according to an advantageous embodiment of the invention. First, the bearer management entity sends 310 a bearer request message BEARER_REQ to the admission control entity. The bearer request may be originated by a mobile station, or in the case of a mobile terminating call, by the network. The admission control entity checks the current load by sending 320 a CHECK_LOAD message to the load control entity, which replies by sending 330 a LOAD_INFO message describing the current load situations. After receiving the load information, the admission control entity calculates 340 a load estimate at least on the basis of the bearer request and the load information. In this example, the load estimate is found to be lower than the first predetermined treshold. Consequently, the AC entity sends 350 an acknowledgement message BEARER_REQ_ACK back to the BM entity.

Next, the AC entity instructs 360 the PC entity to change power control parameters due to admission of the new bearer by sending a TXPWR_UPD_REQ message, which the PC entity acknowledges by sending 370 a TXPWR_UPD_REQ_ACK message. Next, the AC entity instructs the HC entity to change handover control parameters due to admission of the new bearer by sending 380 a HO_TRESHOLD_UPD_REQ message, which the HC entity acknowledges by sending 390 a HO_TRESHOLD_UPD_REQ_ACK message. After this, the AC entity examines the resulting situation in its control area by first requesting 400 load information from the LC entity, which sends 410 information about the current load situation to the AC entity. The AC entity then examines 420 the information, and if the load is found to be over the first predefined limit, the AC entity negotiates 430 with the bearer management entity in order to change the properties of at least one bearer in order to bring the load under the first predefined limit.

Figure 6:
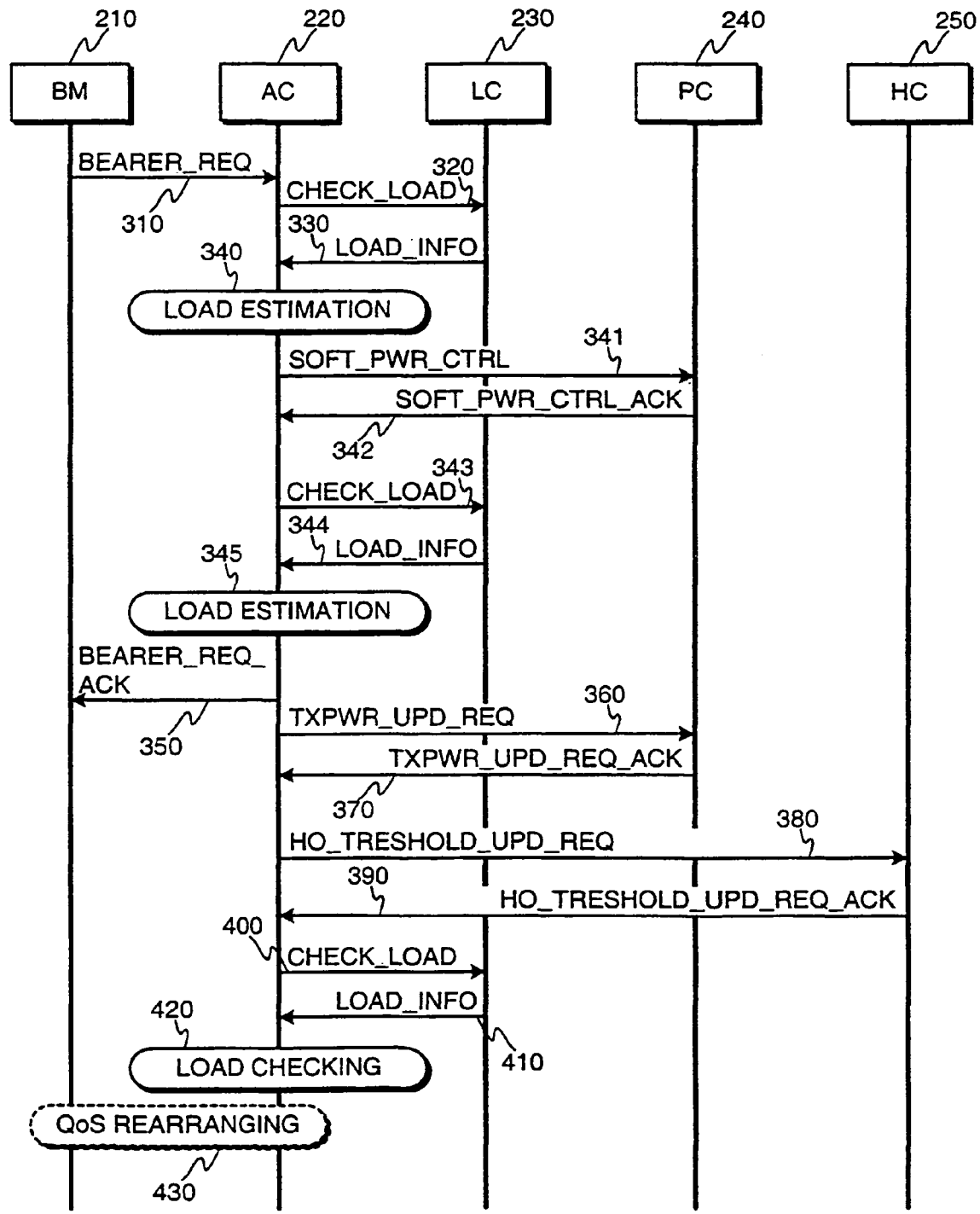
FIG. 6 illustrates signalling of another example of an admission control method according to an advantageous embodiment of the invention.

FIG. 6 illustrates signalling of another example of an admission control method according to an advantageous embodiment of the invention. In the example of FIG. 6, the bearer request increases the load above the first predefined limit.

First, the bearer management entity sends 310 a bearer request message BEARER_REQ to the admission control entity. The bearer request may be originated by a mobile station, or in the case of a mobile terminating call, by the network. The admission control entity checks the current load by sending 320 a CHECK_LOAD message to the load control entity, which replies by sending 330 a LOAD_INFO message describing the current load situation. After receiving the load information, the admission control entity calculates 340 a load estimate at least on the basis of the bearer request and the load information. In this example, the load estimate is found to be higher than the first predetermined treshold. Consequently, the AC entity tries to make room for the requested bearers. In this example, the AC entity performs this by sending 341 a message to the PC entity instructing the PC entity to update the power control parameters. The PC entity lowers the transmission power of bearers, if possible, e.g. if the QoS level required by the bearers allow lowering of the transmission power in the current situation. In any case, the PC entity responds to the AC entity by sending 342 an acknowledgement message back to the AC entity. After receiving the acknowledgement message, the admission control entity checks the current load by sending 343 a CHECK_LOAD message to the load control entity, which replies by sending 344 a LOAD_INFO message describing the current load situation. After receiving the load information, the admission control entity calculates 345 a load estimate at least on the basis of the bearer request and the load information. In this example, the updating of the power control parameters created enough room for the requested bearer or bearers. Consequently, the AC entity sends 350 an acknowledgement message back to the BM entity.

Next, the AC entity instructs 360 the PC entity to change power control parameters due to admission of the new bearer by sending a TXPWR_upd_req message, which the PC entity acknowledges by sending 370 a TXPWR_UPD_REQ_ACK message. Next, the AC entity instructs the HC entity to change handover control parameters due to admission of the new bearer by sending 380 a HO_TRESHOLD_UPD_REQ message, which the HC entity acknowledges by sending 390 a HO_TRESHOLD_UPD_REQ_ACK message. After this, the AC entity examines the resulting situation in its control area by first requesting 400 load information from the LC entity, which sends 410 information about the current load situation to the AC entity. The AC entity then examines 420 the information, and if the load is found to be over the first predefined limit, the AC entity negotiates 430 with the bearer management entity in order to change the properties of at least one bearer in order to bring the load under the first predefined limit.

Figure 7:
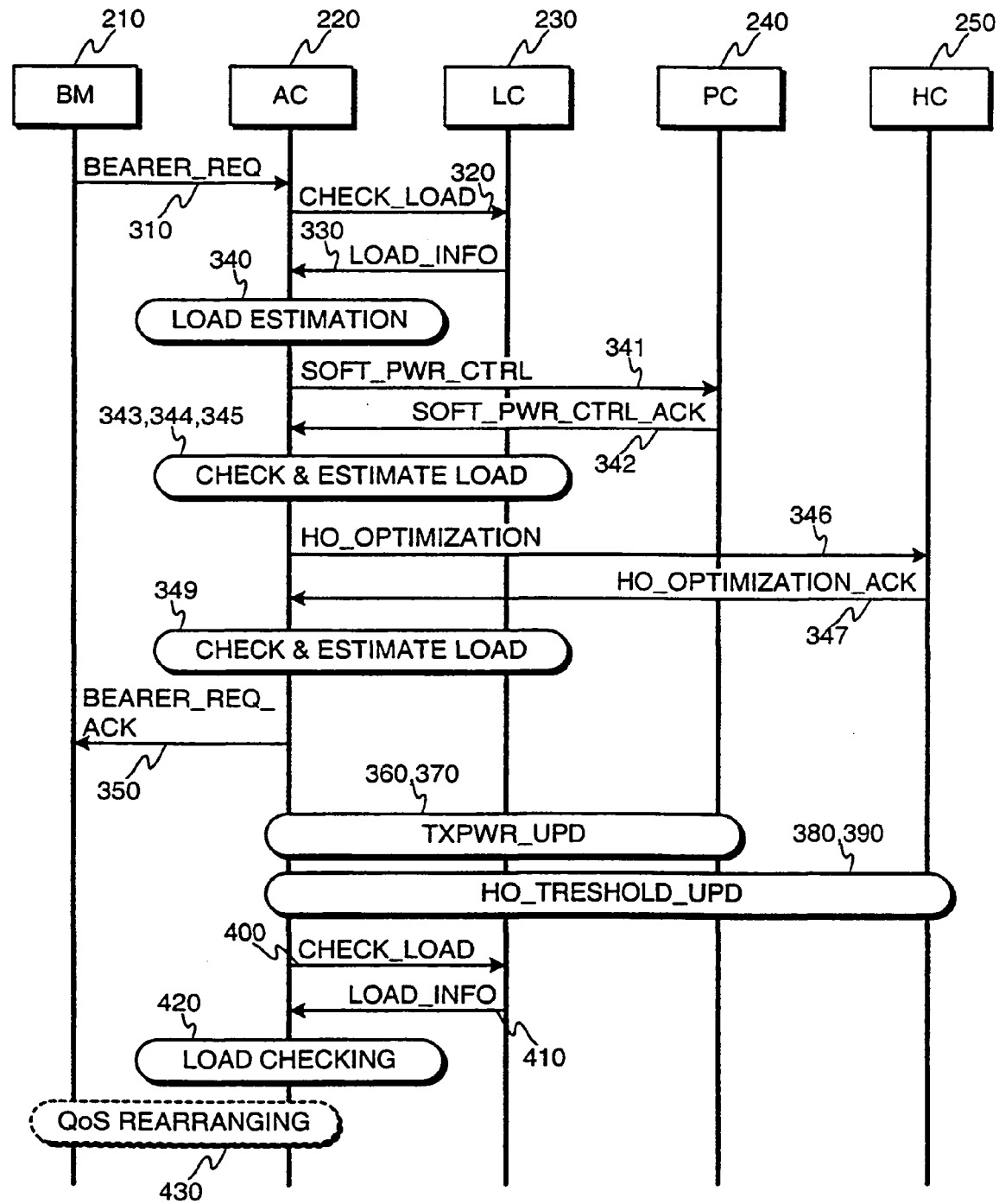
FIG. 7 illustrates signalling of a further example of an admission control method according to an advantageous embodiment of the invention.

FIG. 7 illustrates signalling of a further example of an admission control method according to an advantageous embodiment of the invention. In the example of FIG. 7, the bearer request increases the load above the first predefined limit.

First, the bearer management entity sends 310 a bearer request message BEARER_REQ to the admission control entity. The bearer request may be originated by a mobile station, or in the case of a mobile terminating call, by the network. The admission control entity checks the current load by sending 320 a CHECK_LOAD message to the load control entity, which replies by sending 350 a LOAD_INFO message describing the current load situation. After receiving the load information, the admission control entity calculates 340 a load estimate at least on the basis the bearer request and the load information. In this example, the load estimate is found to be higher than the first predetermined treshold. Consequently, the AC entity tries to make room for the request bearers first by using power control. In this example, the AC entity performs this by sending 341 a message to the PC entity instructing the PC entity to update the power control parameters. The PC entity lowers the transmission power of bearers, if possible, e.g. if the QoS level required by the bearers allow lowering of the transmission power in the current situation. In any case, the PC entity responds to the AC entity by sending 342 an acknowledgement message back to the AC entity. After receiving the acknowledgement message, the admission control entity checks the current load by sending 343 a CHECK_LOAD message to the load control entity, which replies by sending 344 a LOAD_INFO message describing the current load situation. After receiving the load information, the admission control entity calculates 345 a load estimate at least on the basis of the bearer request and the load information. In this example, the updating of the power control parameters did not create enough room for the requested bearer or bearers. Consequently, the AC entity tries to make room for the requested bearers by adjusting handover parameters. In this example, the AC entity sends 346 a command HO_OPTIMIZATION to the HC entity for instructing the HC entity to optimize the handover parameters in order to reduce load in the control area. Consequently, the HC entity changes the parameters controlling handover decisions, if possible without degrading the service level provided to existing bearers. The HC entity then replies by sending 347 an acknowledgement message HO_OPTIMIZATION_ACK to the AC entity. The AC entity when performs 349 again load checking and estimation procedure as described previously for example in connection with steps 343, 344, and 345. In this example, the optimizing of the handover control parameters finally created enough room for the requested bearer or bearers. Consequently, the AC entity sends 350 an acknowledgement message back to the BM entity.

Next, the AC entity instructs 360 the PC entity to change power control parameters due to admission of the new bearer by sending a TXPWR_UPD_REQ message, which the PC entity acknowledges by sending 370 a TXPWR_UPD_REQ_ACK message. Next, the AC entity instructs the HC entity to change handover control parameters due to admission of the new bearer by sending 380 a HO_TRESHOLD_UPD_REQ message, which the HC entity acknowledges by sending 390 a HO_TRESHOLD_UPD_REQ_ACK message. After this, the AC entity examines the resulting situation in its control area by first requesting 400 load information from the LC entity, which sends 410 information about the current load situation to the AC entity. The AC entity then examines 420 the information, and if the load is found to be over the first predetermined limit, the AC entity negotiates 430 with the bearer management entity in order to change the properties of at least one bearer in order to bring the load under the first predefined limit.

Figure 8:
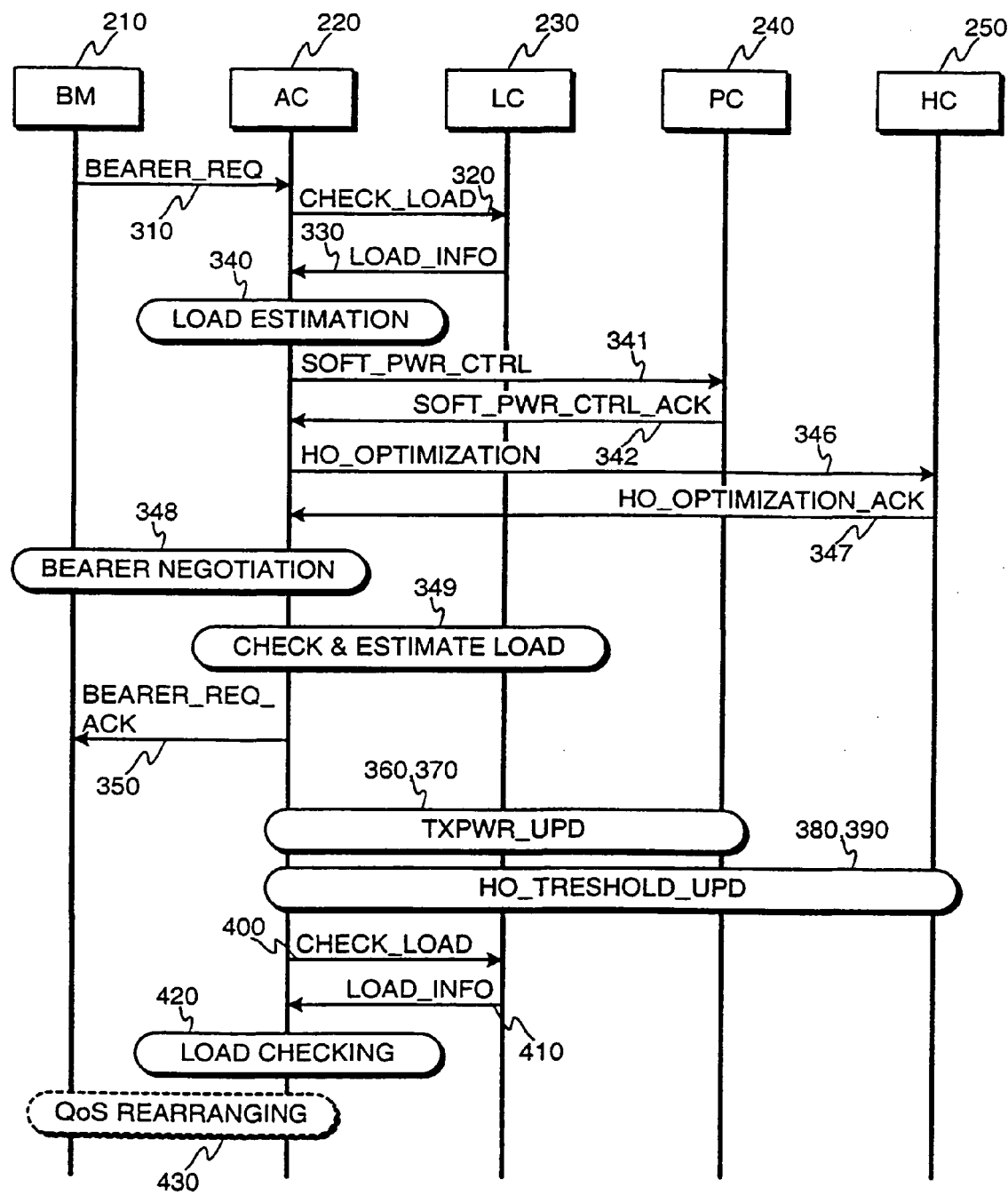
FIG. 8 illustrates signalling of yet another example of an admission control method according to an advantageous embodiment of the invention.

FIG. 8 illustrates signalling of yet another example of an admission control method according to an advantageous embodiment of the invention. In this example, the bearer request results in an estimated load, which is considerably above the first predetermined limit, wherefore the AC entity uses power control and handover control to make room for the requested bearers, and negotiates with the BM entity for lowering the amount of resources needed by the request.

First, the bearer management entity sends 310 a bearer request message BEARER_REQ to the admission control entity. The bearer request may be originated by a mobile station, or in the case of a mobile terminating call, by the network. The admission control entity checks the current load by sending 320 a CHECK_LOAD message to the load control entity, which replies by sending 330 a LOAD_INFO message describing the current load situation. After receiving the load information, the admission control entity calculates 340 a load estimate at least one the basis of the bearer request and the load information. In this example, the load estimate is found to be considerably higher than the first predetermined threshold. Consequently, the AC entity tries to make room for the requested bearers first by using power control. In this example, the AC entity performs this by sending 341 a message to the PC entity instructing the PC entity to update the power control parameters. The PC entity lowers the transmission power of bearers, if possible, e.g. if the QoS level required by the bearers allow lowering of the transmission power in the current situation. The PC entity responds to the AC entity by sending 342 an acknowledgement message back to the AC entity. Further, the AC entity sends 346 a command HO_OPTIMIZATION to the HC entity for instructing the HC entity to optimize the handover parameters in order to reduce load in the control area. Consequently, the HC entity changes the parameters controlling handover decisions, if possible without degrading the service level provided to existing bearers. The HC entity then replies by sending 347 an acknowledgement message HO_OPTIMIZATION_ACK to the AC entity.

Next, the AC entity performs 348 a bearer negotiation procedure with the BM entity in order to reduce the resources required by the requested bearer or bearers, if possible. The AC entity then performs 349 again load checking and estimation procedure as described previously for example in connection with steps 343, 344, and 345. In this example, the optimization of power control and handover control parameters provided enough room for the renegotiated or modified bearer request. Consequently, the AC entity sends 350 an acknowledgement message back to the BM entity.

Next, the AC entity instructs 360 the PC entity to change power control parameters due to admission of the new bearer by sending a TXPWR_UPD_REQ message, which the PC entity acknowledges by sending 370 a TXPWR_UPD_REQ_ACK message. Next, the AC entity instructs the HC entity to change handover control parameters due to admission of the new bearer by sending 380 a HO_TRESHOLD_UPD_REQ_ACK message. After this, the AC entity examines the resulting situation in its control area by first requesting 400 load information from the LC entity, which sends 410 information about the current load situation to the AC entity. The AC entity then examines 420 the information, and if the load is found to be over the first predefined limit, the AC entity negotiates 430 with the bearer management entity in order to change the properties of at least one bearer in order to bring the load under the first predefined limit.

The invention is not limited to be used in any specific area of the cellular network. The admission control method according to the invention can be used to control admission for example in a single cell, in a sector of a cell, or in a plurality of cells such as a routing area or a whole radio access network.

The control region may further divided into transmission or interference power or SIR subregions, each having a fixed and an adaptive part of radio resources of the control region to be allocated.

The name of a given functional entity, such as the radio network controller, is often different in the context of different cellular telecommunication systems. For example, in the GSM system the functional entity corresponding to a radio network controller (RNC) is the base station controller (BSC). Therefore, the term radio network controller in the claims is intended to cover all corresponding functional entities regardless of the term used for the entity in the particular cellular telecommunication system. Further, the various command and message names such as the LOAD_INFO message name are intended to be examples only, and the invention is not limited to using the command and message names recited in this specification. Further, the term modified in the attached claims is intended to cover any changes effected to the parameters of at least one bearer, whether renegotiated or changed without renegotiation.

The invention can be used in any cellular telecommunication system, which is at least in part based on spread spectrum technology.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

It is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for admission control in a cellular telecommunication system comprising the steps of:
   receiving a bearer request;
   checking current load;
   calculating a preliminary load estimate based at least on the current load and said bearer request; and
   if said preliminary load estimate is lower than a predetermined limit, performing the steps of:
      admitting said bearer request;
      allocating transmission resources according to said request; and
      checking the resulting load; or
   if said preliminary load estimate is higher than said predetermined limit, performing the step of:
      attempting the release of transmission capacity resources of the cellular telecommunication system in order to bring the resulting load under said predetermined limit thereby allowing admittance of said requested bearer, by performing the step of:
         selecting at least one cellular network parameter or at least one type of cellular network parameter to modify, wherein parameters affecting non-real-time bearers are selected for modification before parameters affecting real-time bearers.

2. The method according to claim 1, wherein if, after performing the steps of allocating transmission resources and checking the resulting load when the preliminary load estimate is lower than the predetermined limit, the resulting load is larger than said predetermined limit, the method further comprises the step of:
   modifying at least one parameter of at least one bearer in order to bring the resulting load under said predetermined limit.

3. The method according to claim 2, wherein the step of modifying at least one parameter of at least one bearer in order to bring the resulting load under the predetermined limit comprises the step of:
   transmitting, by an admission control entity, a message to a power control entity, wherein said message comprises an instruction to change at least one power control parameter.

4. The method according to claim 2, wherein the step of modifying at least one parameter of at least one bearer in order to bring the resulting load under the predetermined limit comprises the step of:
   transmitting, by an admission control entity, a message to a handover control entity, wherein said message comprises an instruction to change at least one handover control parameter.

5. The method according to claim 2, wherein said step of modifying at least one parameter of at least one bearer in order to bring the resulting load under said predetermined limit comprises the step(s) of:
   negotiating, by an admission control entity, with a bearer management entity in order to reduce the resources required by the requested bearer; and/or
   negotiating, by the admission control entity, with the bearer management entity in order to reduce the resources required by one or more bearers other than the requested bearer.

6. The method according to claim 1, wherein, after said step of attempting the release of transmission capacity resources when the preliminary load estimate is higher than the predetermined limit, the method further comprises the steps of:
   checking the current load;
   calculating a resulting load estimate based at least on the current load and the bearer request; and
   if said resulting load estimate is lower than the predetermined limit, performing the steps of:
      admitting the bearer request;
      allocating transmission resources according to said request; and
      checking the resulting load.

7. The method according to claim 6, wherein, if the resulting load is larger than said predetermined limit, the method further comprises the step of:
   modifying at least one parameter of at least one bearer in order to bring the resulting load under said predetermined limit.

8. The method according to claim 7, wherein the at least one bearer is the requested bearer.

9. The method according to claim 6, wherein, if the resulting load is larger than said predetermined limit, the method further comprises the step of:
   rejecting the bearer request.

10. The method according to claim 6, wherein, if the resulting load is larger than said predetermined limit, the method further comprises the step of:
    scheduling the bearer request for later action.

11. The method according to claim 1, wherein the step of attempting the release of transmission capacity resources comprises the step of:
    modifying the selected at least one cellular network parameter or at least one type of cellular network parameter of the bearer request to thereby lower the amount of resources required by the request;
    checking current load;
    calculating a resulting load estimate based at least on the current load and said modified bearer request; and
    if said resulting load estimate is lower than the predetermined limit, performing the steps of:
       admitting said modified bearer request;
       allocating transmission resources according to said modified bearer request; and
       checking the resulting load.

12. The method according to claim 11, wherein, if the resulting load is larger than said predetermined limit, the method further comprises the step of:
    modifying at least one parameter of at least one bearer in order to bring the resulting load under said predetermined limit.

13. The method according to claim 1, wherein said step of attempting the release of transmission capacity resources comprises the step of:
    adjusting one or more handover control parameters of the cellular network.

14. The method according to claim 13, wherein the handover control parameters comprise parameters which define thresholds for triggering a handover from one cell to another.

15. The method according to claim 13, wherein the step of adjusting one or more power control parameters of the cellular network comprises the step of:
    transmitting, by an admission control entity, a message to a power control entity, wherein said message comprises an instruction to update at least one power control parameter.

16. The method according to claim 15, wherein the step of adjusting one or more power control parameters of the cellular network further comprises the step of:
    receiving, by the admission control entity, an acknowledgment message from the power control entity; and
    checking, by an admission control entity, a current load.

17. The method according to claim 1, wherein said step of attempting the release of transmission capacity resources comprises the step of:
    adjusting one or more power control parameters of the cellular network.

18. The method according to claim 17, wherein the power control parameters comprise an upper limit and/or a lower limit of transmission power margins of existing connections.

19. The method according to claim 1, wherein said step of attempting the release of transmission capacity resources comprises the step of:
    adjusting one or more load control parameters of the cellular network.

20. The method according to claim 1, wherein said step of attempting the release of transmission capacity resources comprises the step of:
    adjusting one or more soft handover and/or soft capacity margins of the cellular network.

21. The method according to claim 20, wherein the step of adjusting soft handover and/or soft capacity margins comprises the step of:
    adding or deleting a branch of an existing bearer.

22. The method according to claim 1, wherein the selecting step is performed according to a criteria dependent on the requirements of the particular application.

23. The method according to claim 1, wherein the selecting step is performed according to the amount the preliminary load estimate exceeds the predetermined limit.

24. The method according to claim 1, wherein the selection is random.

25. The method according to claim 1, wherein power control parameters, load control parameters, soft handover margins, soft capacity margins, handover control parameters, and/or parameters of the bearer request comprise types of cellular network parameters.

26. The method according to claim 1, wherein said step of attempting the release of transmission capacity resources further comprises the steps of:
   modifying the selected at least one cellular network parameter or type of cellular network parameter;
   checking the current load;
   calculating a resulting load estimate based at least on the current load and the bearer request; and
   if said resulting load estimate is lower than the predetermined limit, admitting the bearer request.

27. The method according to claim 26, wherein, if said resulting load estimate is higher than the predetermined limit, said step of attempting the release of transmission capacity resources further comprises the steps of:
   selecting, again, at least one cellular network parameter or type of cellular network parameter to modify.

28. The method according to claim 27, wherein a type of cellular network parameter is selected in the steps of selecting, and said step of selecting, again, an least one cellular network parameter or type of cellular network parameter to modify comprises the steps of:
   determining whether all available types of parameters have been modified; and
   if all have not been modified, selecting a type of parameter to modify from a group consisting of types of parameters which have not been modified.

29. The method according to claim 28, wherein, if all available types of parameters have been modified, the method further comprises the step of:
   denying the bearer request.

30. The method according to claim 1, wherein said step of attempting the release of transmission capacity resources comprises the step of:
   modifying a selected first type of cellular network parameter;
   wherein power control parameters, load control parameters, soft handover margins, soft capacity margins, handover control parameters and/or parameters of the bearer request comprise types of parameters.

31. The method according to claim 30, wherein said step of attempting the release of transmission capacity resources further comprises, after the step of modifying the selected first type of cellular network parameter, the steps of:
   checking the current load;
   calculating a resulting load estimate based at least on the current load and the bearer request; and
   if said resulting load estimate is lower than the predetermined limit, admitting the bearer request.

32. The method according to claim 31, wherein, if said resulting load estimate is higher than the predetermined limit, said step of attempting the release of transmission capacity resources further comprises the step of:
   modifying a second type of parameter.

33. The method according to claim 1, wherein the current load, preliminary load estimate, and the resulting load are determined for a control area, said control area being a region of the cellular telecommunication system controlled by an admission control entity.

34. The method according to claim 33, wherein said control area comprises a sector of a cell, a cell, a plurality of cells, a routing area, and/or an entire radio access network.

35. The method according to claim 33, wherein a transmission load capacity of the control area has a stable load region, within which the system can handle all traffic, a critical load region above the stable load region, and an overload region above the critical load region.

36. The method according to claim 35, wherein the critical load region is used as a soft capacity margin for the control area.

37. The method according to claim 35, wherein the predetermined limit is the upper limit of the stable load region.

38. The method according to claim 33, wherein the preliminary load estimate is calculated in terms of transmission power capacity in the control area.

39. The method according to claim 38, wherein the step of calculating a preliminary load estimate comprises the step of:
   calculating $P_{req}+P_{oc}$
where
   $P_{req}$=transmission power of the requested bearer
   $P_{oc}$=transmission power of existing bearers in the control area;
wherein the preliminary load estimate is lower than the predetermined limit when the following condition is met:

$$P_{req}+P_{oc} \leq P_{stable}$$

where $P_{stable}$=the upper limit of a stable load region for the control area.

40. The method according to claim 1, wherein the transmission resources comprise radio resources, logical resources, codes, and/or transmission capacity.

41. The method according to claim 1, wherein the step of receiving a bearer request comprises the step of:
   receiving, by an admission control entity, a bearer request message.

42. The method according to claim 41, wherein the step of checking current load comprises the steps of:
   transmitting, by the admission control entity, a message requesting load information to a load control entity; and
   receiving, by the admission control entity, a message comprising current load information from the load control entity.

43. The method according to claim 42, wherein the step of admitting the bearer request comprises the step of:
   transmitting, by the admission control entity, an acknowledgement message to a bearer management entity.

44. The method according to claim 1, wherein said step of attempting the release of transmission capacity resources comprises the step of:
   negotiating, by an admission control entity, with a bearer management entity in order to reduce the resources required by the requested bearer.

45. The method according to claim 1, wherein the cellular telecommunication system comprises at least one mobile station having a multidiversity connection.

46. A method for admission control in a cellular telecommunication system comprising at least one mobile station having a multidiversity connection, comprising the steps of:
   at least one of the following steps:
      setting, by an admission control entity, a bit error rate for outer loop power control;
      setting, by the admission control entity, a frame error rate for outer loop power control; and/or
      setting, by the admission control entity, initial signal-to-noise setpoints for outer loop power control;
   receiving a bearer request;
   checking current load;
   calculating a preliminary load estimate based at least on the current load and said bearer request;

if said preliminary load estimate is lower than a predetermined limit, performing the steps of:
   admitting said bearer request;
   allocating transmission resources according to said request; and
   checking the resulting load; or
if said preliminary load estimate is higher than said predetermined limit, performing the step of:
   attempting the release of transmission capacity resources of the cellular telecommunication system in order to bring the resulting load under said predetermined limit thereby allowing admittance of said requested bearer.

47. The method according to claim 46, wherein cellular network parameters which do not substantially affect a type of bearer are preferentially selected.

48. A method for admission control in a cellular telecommunication system comprising at least one mobile station having a multidiversity connection, comprising the steps of:
   setting, by an admission control entity, a power margin for transmission power of a multidiversity bearer of the mobile station having a specified quality of service;
   receiving a bearer request;
   checking current load;
   calculating a preliminary load estimate based at least on the current load and said bearer request;
   if said preliminary load estimate is lower than a predetermined limit, performing the steps of:
      admitting said bearer request;
      allocating transmission resources according to said request; and
      checking the resulting load; or
   if said preliminary load estimate is higher than said predetermined limit, performing the step of:
      attempting the release of transmission capacity resources of the cellular telecommunication system in order to bring the resulting load under said predetermined limit thereby allowing admittance of said requested bearer.

49. The method according to claim 48, further comprising the step of:
   making, by the mobile station, a final transmission power adjustment decision.

50. The method according to claim 49, wherein, in said step of making the final transmission power adjustment decision, the mobile station decides to increase transmission power only when the increased power level is equal to, or smaller than, a predetermined upper limit for the transmission power of the connection, and if the increased transmission power is within said power margin for the transmission power.

51. The method according to claim 50, wherein said step of making the final transmission power adjustment decision is performed, when the outer loop power control commands demand an increase of the power level, by the mobile station according to the following condition:

$$P_{trx}=P_o+DSS \leq P_{max} \epsilon P_{margin}$$

where
   $P_{trs}$=transmission power after increase
   $P_o$=current transmission power
   DSS=dynamic step size to be added to current level
   $P_{max}$=said predetermined upper limit for transmission power
   $P_{margin}$=said power margin set by the admission control entity.

52. The method according to claim 49, wherein, said step of making the final transmission power adjustment decision, the mobile station decides to decrease transmission power only when the decreased power level is equal to, or larger than, a predetermined lower limit for the transmission power of the connection, and if the decreased transmission power is within said power margin for the transmission power.

53. The method according to claim 52, wherein said step of making the final transmission power adjustment decision is performed, when the outer loop power control commands demand a decrease of the power level, by the mobile station according to the following condition:

$$P_{trx}=P_o-DSS \geq P_{min} \epsilon P_{margin}$$

where
   $P_{trx}$=transmission power after increase
   $P_o$=current transmission power
   DSS=dynamic step size to be subtracted from current level
   $P_{min}$=said predetermined lower limit for transmission power
   $R_{margin}$=said power margin set by the admission control entity.

54. A cellular telecommunication system comprising:
   an admission control entity for controlling admissions of new bearers in a control area of the cellular telecommunication system, wherein, when said admission control entity receives a bearer request, said admission control entity checks a current load in the control area and calculates a preliminary load estimate based at least on the current load and said bearer request; and
   a power control entity for controlling power levels of mobile stations and base stations in the control area, for receiving an update message from the admission control entity after a new bearer has been admitted, for updating power levels to account for the changed transmission environment based on said update message, for receiving a command message from the admission control entity indicating that at least one power control parameter should be adjusted, and for transmitting an acknowledgement message to the admission control entity indicating that either a command message or an update message was received from the admission control entity;
   wherein, if said preliminary load estimate is lower than a predetermined limit, said bearer request is admitted and transmission resources of the control area are allocated according to said request, after which the admission control entity checks the resulting load in the control area; and
   wherein, if said preliminary load estimate is higher than said predetermined limit, the admission control entity attempts to release transmission capacity resources of the control area in order to bring the resulting load under said predetermined limit thereby allowing admittance of said requested bearer.

55. The cellular telecommunication system according to claim 54, further comprising:
   a bearer management entity for managing bearers in the control area, for transmitting a bearer request message to the admission control entity, for receiving an acknowledgment message from the admission control entity, and for admitting the bearer of the bearer request based on the received acknowledgment message.

56. The cellular telecommunication system according to claim 54, further comprising:
a load control entity for controlling the transmission capacity of the control area, for receiving a query message from the admission control entity, and for transmitting a message bearing information about the current load to the admission control entity based on the received query message.

57. The cellular telecommunication system according to claim 56, wherein the admission control entity transmits said query message at least whenever a new bearer request is received or a new bearer is admitted.

58. The cellular telecommunication system according to claim 54, wherein the admission control entity transmits said command message at least when it is attempting to release transmission capacity resources of the control area in order to bring the resulting load under said predetermined limit thereby allowing admittance of said requested bearer.

59. A cellular telecommunication system comprising:
an admission control entity for controlling admissions of new bearers in a control area of the cellular telecommunication system, wherein, when said admission control entity receives a bearer request, said admission control entity checks a current load in the control area and calculates a preliminary load estimate based at least on the current load and said bearer request; and
a handover control entity for controlling handovers between cells when a mobile station moves from one cell to another, for receiving an update message from the admission control entity after a new bearer has been admitted, for updating handover control parameters to account for the changed transmission environment based on said update message, for receiving a command message from the admission control entity indicating that at least one handover control parameter should be optimized, and for transmitting an acknowledgment message to the admission control entity indicating that either a command message or an update message was received from the admission control entity;
wherein, if said preliminary load estimate is lower than a predetermined limit, said bearer request is admitted and transmission resources of the control area are allocated according to said request, after which the admission control entity checks the resulting load in the control area; and
wherein, if said preliminary load estimate is higher than said predetermined limit, the admission control entity attempts to release transmission capacity resources of the control area in order to bring the resulting load under said predetermined limit thereby allowing admittance of said requested bearer.

60. The cellular telecommunication system according to claim 59, further comprising:
a power control entity for controlling power levels of mobile stations and base stations in the control area, for receiving an update message from the admission control entity after a new bearer has been admitted, for updating power levels to account for the changed transmission environment based on said update message, for receiving a command message from the admission control entity indicating that at least one power control parameter should be adjusted, and for transmitting an acknowledgment message to the admission control entity indicating that either a command message or an update message was received from the admission control entity.

61. The cellular telecommunication system according to claim 59, wherein the admission control entity transmits said command message at least when it is attempting to release transmission capacity resources of the control area in order to bring the resulting load under said predetermined limit thereby allowing admittance of said requested bearer.

62. A method for admission control in a control area of a cellular telecommunication system comprising the steps of:
maintaining a priority hierarchy among requested and existing bearers;
whenever a request for the admittance of a new bearer is received, estimating a result of the admittance of the new bearer on the available capacity of the control area;
if the estimated results show that a stable load capacity threshold will not be exceeded by the admittance of the new bearer, admitting said bearer and allocating transmission resources according to said request;
whenever a new bearer is admitted, determining an actual result of the admittance of the new bearer on the available capacity of the control area; and
if either (i) the estimated results show that the stable load capacity threshold will be exceeded by the admittance of the new bearer, or (ii) the determined actual results show that the stable load capacity threshold was exceeded by the admittance of the new bearer, manipulating at least one cellular telecommunication system parameter of the control area in order to bring the load resulting from said manipulation under said stable load capacity limit, wherein the higher priority bearers are affected less than the lower priority bearers.

63. The method according to claim 62, wherein said step of estimating the result of the admittance of the new bearer on the available capacity of the control area comprises the steps of:
determining a probability that a load comprising existing bearers and the requested bearer would exceed a predetermined system reliability limit.

64. The method according to claim 62, wherein said step of estimating the result of the admittance of the new bearer on the available capacity of the control area comprises the step of:
determining whether an estimated load comprising existing bearers and the requested bearer would exceed a predetermined system capacity limit.

65. The method according to claim 62, wherein said step of manipulating at least one cellular telecommunication system parameter comprises the step of:
manipulating at least one cellular telecommunication system parameter of a real-time bearer.

66. The method according to claim 62, further comprising the step of:
if (i) the requested bearer is an emergency call, and (ii) if the estimated results show that a critical load capacity threshold will not be exceeded by the admittance of the new bearer, admitting said bearer and allocating transmission resources according to said request.

67. The method according to claim 62, wherein real time bearers of emergency calls have high priority, real time bearers have middle priority, and non-real time bearers have low priority.

68. The method according to claim 62, wherein said at least one cellular telecommunication system parameter being manipulated in said step of manipulating at least one cellular telecommunication system parameter is within a type of cellular telecommunication system parameter.

69. The method according to claim 68, wherein the type of cellular telecommunication system parameter comprises one of handover control parameters, power control parameters, load control parameters, soft handover and/or soft capacity margins, and parameters of the requested bearer.

70. The method according to claim 68, wherein said type of cellular telecommunication system parameter is predetermined.

71. The method according to claim 70, wherein said step of manipulating at least one cellular telecommunication system parameter comprises the steps of:
manipulating at least one cellular telecommunication system parameter of a first predetermined type;
estimating a result of the admittance of the new bearer on the available capacity of the control area, said available capacity having changed because of the manipulation of the at least one cellular telecommunication system parameter;
if the estimated results show that a stable load capacity threshold will not be exceeded by the admittance of the new bearer, admitting said bearer and allocating transmission resources according to said request; and
if the estimated results show that the stable load capacity threshold will be exceeded by the admittance of the new bearer, manipulating at least one cellular telecommunications system parameter of a second predetermined type.

72. The method according to claim 68, wherein said step of manipulating at least one cellular telecommunication system parameter comprises the step of:
selecting the type of cellular telecommunication system parameter within which is the at least one cellular telecommunication system parameter.

73. The method according to claim 72, wherein the type is selected based on an amount the stable load capacity threshold was exceeded.

74. The method according to claim 72, wherein the type is selected at random.

75. The method according to claim 72, wherein said step of selecting the type of cellular telecommunication system parameter comprise the step of:
selecting the type of cellular telecommunication system parameter based on the priority hierarchy among requested and existing bearers so that higher priority bearers are affected less than lower priority bearers when at least one cellular telecommunication system parameter is manipulated.

76. The method according to claim 72,
wherein said step of selecting the type of cellular telecommunication system parameter comprises the step of:
selecting a first type of cellular telecommunication system parameter;
wherein said step of manipulating at least one cellular telecommunication system parameter comprises the step of:
manipulating at least one cellular telecommunication system parameter of the selected first type;
estimating a result of the admittance of the new bearer on the available capacity of the control area, said available capacity having changed because of the manipulation of the at least one cellular telecommunication system parameter;
if the estimated results show that a stable load capacity threshold will not be exceeded by the admittance of the new bearer, admitting said bearer and allocating transmission resources according to said request; and
if the estimated results show that the stable load capacity threshold will be exceeded by the admittance of the new bearer, selecting a second type of at least one cellular telecommunication system parameter to be modified.

77. The method according to claim 62, wherein said control area comprises a sector of a cell, a cell, a plurality of cells, a routing area, and/or an entire radio access network.

78. The method according to claim 62, wherein the stable load capacity threshold is an upper limit of transmission load capacity of a stable load region within which the system can handle all traffic.

79. The method according to claim 78, wherein a critical load region above the stable load region and below an overload region is used as a soft capacity margin.

80. A method for admission control in a control area of a cellular telecommunication system comprising the steps of:
whenever a request for the admittance of a new bearer is received, determining a probability that a load comprising existing bearers and the requested bearer would exceed a predetermined system reliability limit, according to the requirement that:

$$\text{PROB}(C_{oc} \geq C_{tot}) \leq \gamma$$

where
PROB=probability
$C_{oc}$=capacity occupied by bearers
$C_{tot}$=total capacity of said control area
$\gamma$=predetermined system reliability limit;
if the estimated results show that the predetermined system reliability limit will not be exceeded by the admittance of the new bearer, admitting said bearer and allocating transmission resources according to said request;
whenever a new bearer is admitted, determining an actual result of the admittance of the new bearer on the available capacity of the control area; and
if either (i) the estimated results show that the stable load capacity threshold will be exceeded by the admittance of the new bearer, or (ii) the determined actual results show that the stable load capacity threshold was exceeded by the admittance of the new bearer, manipulating at least one cellular telecommunication system parameter of the control area in order to bring the load resulting from said manipulation under said stable load capacity limit.

81. The method according to claim 80, wherein the capacity is measured and/or determined based on signal-to-inference ratios (SIRs).

82. The method according to claim 80, wherein the capacity is measured and/or determined based on transmission power in the control area.

83. A method for admission control in a control area of a cellular telecommunication system comprising the steps of:
whenever a request for the admittance of a new bearer is received, determining whether an estimated load comprising existing bearers and the requested bearer would exceed a predetermined system capacity limit, according to the requirement that:

$$P_{req} + P_{oc} \leq P_{stable}$$

where
$P_{req}$=transmission power of the requested bearer
$P_{oc}$=transmission power of existing bearers in the control area;
$P_{stable}$=the upper limit of a stable load capacity for the control area;

if the estimated results show that the predetermined system capacity limit will not be exceeded by the admittance of the new bearer, admitting said bearer and allocating transmission resources according to said request;

whenever a new bearer is admitted, determining an actual result of the admittance of the new bearer on the available capacity of the control area; and if either (i) the estimated results show that the stable load capacity threshold will be exceeded by the admittance of the new bearer, or (ii) the determined actual results show that the stable load capacity threshold was exceeded by the admittance of the new bearer, manipulating at least one cellular telecommunication system parameter of the control area in order to bring the load resulting from said manipulation under said table load capacity limit.

\* \* \* \* \*